United States Patent
Xue et al.

(10) Patent No.: US 10,228,974 B2
(45) Date of Patent: Mar. 12, 2019

(54) INTELLIGENT MANAGEMENT OF PROCESSING TASKS ON MULTI-TENANT OR OTHER CONSTRAINED DATA PROCESSING PLATFORM

(71) Applicant: NETSUITE INC., San Mateo, CA (US)

(72) Inventors: Wei (Michelle) Xue, Redwood City, CA (US); Clinton Blackburn, Castro Valley, CA (US); Jakub Chaloupka, Brno (CZ); Gaurav Bawa, Sunnyvale, CA (US)

(73) Assignee: NETSUITE INC., San Mateo, CA (US)

( * ) Notice: Subject to any disclaimer, the term of this patent is extended or adjusted under 35 U.S.C. 154(b) by 223 days.

(21) Appl. No.: 15/140,212

(22) Filed: Apr. 27, 2016

(65) Prior Publication Data

US 2016/0321108 A1    Nov. 3, 2016

Related U.S. Application Data

(60) Provisional application No. 62/153,951, filed on Apr. 28, 2015.

(51) Int. Cl.
*G06F 9/46* (2006.01)
*G06F 9/50* (2006.01)

(52) U.S. Cl.
CPC ............... *G06F 9/50* (2013.01); *G06F 9/466* (2013.01)

(58) Field of Classification Search
None
See application file for complete search history.

(56) References Cited

U.S. PATENT DOCUMENTS

| | | | |
|---|---|---|---|
| 2002/0156932 A1 | 10/2002 | Schneiderman | |
| 2014/0101663 A1* | 4/2014 | Dickson | G06F 9/5038 718/103 |
| 2014/0201757 A1 | 7/2014 | Bird et al. | |
| 2014/0359632 A1* | 12/2014 | Kishan | G06F 9/4881 718/103 |
| 2015/0199208 A1* | 7/2015 | Huang | G06F 9/45533 718/1 |

OTHER PUBLICATIONS

ISA/US; USPTO; Notification of Transmittal of International Search Report & Written Opinion; dated Aug. 4, 2016; pp. 1-8.

* cited by examiner

*Primary Examiner* — Lewis A Bullock, Jr.
*Assistant Examiner* — Melissa A Headly
(74) *Attorney, Agent, or Firm* — Kraguljac Law Group, LLC (57) ABSTRACT

Systems and methods to identify to iteratively accomplish a complex task by mapping the complex task into a series of smaller tasks and then to reduce the task by executing one or more of the smaller tasks. Such a system ensures that a user does not have to be familiar with the operational environment of the platform (governance rules, architecture, and the like) when scripting tasks. Instead, the user can concentrate on the logic or purpose of the task, and various embodiments of the system will "intelligently" process/execute the task in the most efficient way, without violating the governance constraints imposed on users or accounts as part of the multi-tenant environment. Among other benefits, this approach permits users to more efficiently describe desired tasks and hence to more effectively utilize the platform.

17 Claims, 6 Drawing Sheets

INTELLIGENT MANAGEMENT OF PROCESSING TASKS ON MULTI-TENANT OR OTHER CONSTRAINED DATA PROCESSING PLATFORM

PRIORITY CLAIM

This application claims the benefit of U.S. Provisional Application No. 62/153,951, entitled "Intelligent Management of Processing Tasks on Multi-Tenant or Other Constrained Data Processing Platform," filed Apr. 28, 2015, which is incorporated by reference in its entirety herein for all purposes.

BACKGROUND

A multi-tenant computing or data processing environment requires appropriate administration and control in order to ensure that demands placed on its resources (processors, data store, communication and data transfer mechanisms, and the like) by one or more tenants and respective associated users do not have an impact on the expected availability of resources to the users of other tenants. However, this does not mean that no tenant/users may have a priority to utilize certain resources under certain conditions, or that a tenant/users may not be subject to one or more constraints or conditions on their access to resources. In some situations, such constraints, conditions, criteria, or rules may be implemented in the form of a "governance" rule. A governance rule may be used to specify the conditions or situations under which a response to a request of a user to the multi-tenant computing or data processing environment is delayed, suspended, or partially satisfied.

While governance rules and conditions prevent a request or series of requests from monopolizing platform resources in a manner that harms other users of the platform, these same rules and conditions can cause difficulties for the user or users to whom they are applied. For example, some governance rules may prevent or impede a user from being able to have the platform execute a complex data processing task. This is because a complex task may involve multiple uses of platform resources, and the user requesting the task has no way of knowing what the demands on the platform will be during the time the task is being executed (and hence which, if any, governance rules may be satisfied or triggered).

This means that the more complex the task and/or the longer the period of time it takes to execute the task, the more likely it is that at least one step or stage of the task will encounter a governance rule/condition/limit that impedes completing the task in any meaningful timely manner. It is desired that a system and method directed to addressing the problem(s) caused by the existence of governance rules when executing a complex process or task, both individually and collectively should be realized.

BRIEF DESCRIPTION OF THE DRAWINGS

Embodiments of the subject matter disclosed herein in accordance with the present disclosure will be described with reference to the drawings, in which.

Note that the same numbers are used throughout the disclosure and figures to reference like components and features.

DETAILED DESCRIPTION

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

Among other things, the present subject matter may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that is programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

In some embodiments, the subject matter may be implemented in the context of a multi-tenant, "cloud" based environment (such as a multi-tenant business data processing platform), typically used to develop and provide web services and business applications for end users. This exemplary implementation environment will be described with reference to FIGS. 1-5 below. Note that embodiments may also be implemented in the context of other computing or operational environments or systems, such as for an individual business data processing system, a private network used with a plurality of client terminals, a remote or on-site data processing system, another form of client-server architecture, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a data store such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

By way of overview, various embodiments as discussed herein are directed to systems, apparatuses, and methods for more efficiently handling the execution of multiple complex tasks in a multi-tenant computing platform. When a user wants to execute a complex task on a multi-tenant platform, because of one or more governance constraints (such as constraints on transactions, requests, rate of requests, data store accesses, processor cycles permitted per user or per account, a rule or criteria based on a related event or condition, and the like), the user may have to expend significant resources of the platform to break a larger or more complex task into smaller portions. Such smaller portions may be necessary to satisfy the relevant governance constraints wherein the user then arranges for the smaller portions to utilize different resources or resource sets to enable a parallel execution path, and then synchronizes the parallel tasks when they are completed in order to produce the final result.

This can be a demanding requirement that can create problems for the user when developing the desired logic for the complete task. Ideally, the user should only need to be concerned with writing the logic of a task, and not with defining how a task should be executed within a specific computing or data processing environment. Thus, various embodiments of the systems and methods as discussed herein provide a more efficient manner of collecting, analyzing and processing complex tasks that may invoke various computing resources across a multi-tenant distributed platform.

In some embodiments, the systems and methods provide a solution to this problem by enabling the user to instruct the platform/system what to do (a goal, a final state) and by identifying an element of the task (a unit or entity that represents the level at which the data will be processed by the platform when executing the task), without requiring that the user specify how to do a task. This means that the user does not have to be familiar with the operational environment of the platform (its governance rules, architecture, and the like) when describing a task. Instead, the user can concentrate on the logic or purpose of the task, and various embodiments of the system will "intelligently" process/execute the task in the most efficient way, without violating the governance constraints imposed on users or accounts as part of the multi-tenant environment. Among other benefits, this approach permits users to more efficiently describe desired tasks and hence to more effectively utilize the platform. This should enable a larger number of users and types of tasks to be served by the platform In one embodiment, a user describes the work/task to be performed based on "atomic" units of work, and in response, the system automatically ensures that all pending or required work is discovered, scheduled, and completed in a timely manner, but without violating the applicable governance constraints or exceeding the desired operating conditions of the platform infrastructure. Assuming no problem or issue that prevents it, this ensures that there is no resource "starving" across multiple tenants caused by providing computing, data storage or data processing services to one tenant account.

In one embodiment, the system and method provides an interface for four different stages: (1) input data stage, (2) map data stage, (3) reduce data stage, and (4) summarize data stage. With these interfaces, a user can accomplish a desired task by implementing one or more of these interfaces. However, a user may not need to worry about how each of the stages is scheduled, executed, and synchronized. The user also may not need to worry whether a large or demanding task will monopolize the resources (processing capability, data store access, data channels, and the like) and cause other tasks requested within the account to be starved of needed resources.

Further, in an embodiment, the system may dynamically change the task or event scheduling process/rules based on various statistics of the current running instance or based on past execution history. For example, the same script may take a relatively long time to be executed or a relatively short time to be executed based on the input data size. The system may use a different scheduling rule in these two cases in order to achieve an optimal processing efficiency. This is an example of an adaptive or dynamic aspect of the system and method as discussed herein. The system may "learn" more about what factors or parameters of a requested task can cause a situation in which a governance rule/condition is exceeded/satisfies. Thus the system can alter how, or in what order, certain parts of a task are executed. Note that this adaptive or dynamic aspect may also take the form of having the task or event scheduling process/rules be altered or modified by the real-time value of certain data or the current state of a task on the platform. Further, the real-time value of certain data or the current state of a task on the platform may be that associated with the user, the tenant, or with another tenant.

Figure 2:
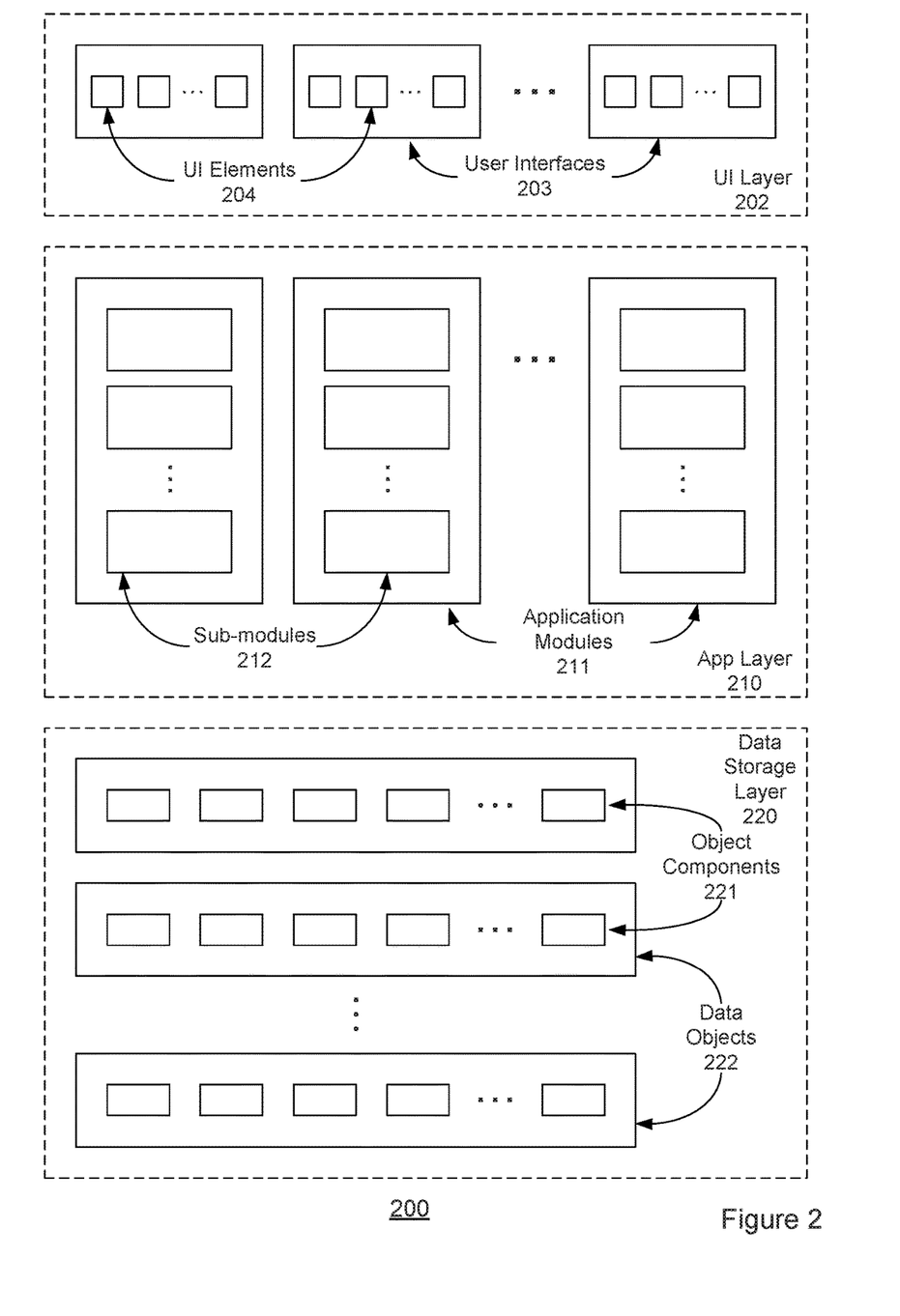
FIG. 2 is a diagram illustrating additional details of the elements or components of the multi-tenant distributed computing service platform of FIG. 1, in which an embodiment of the subject matter disclosed herein may be implemented.
Figure 3:
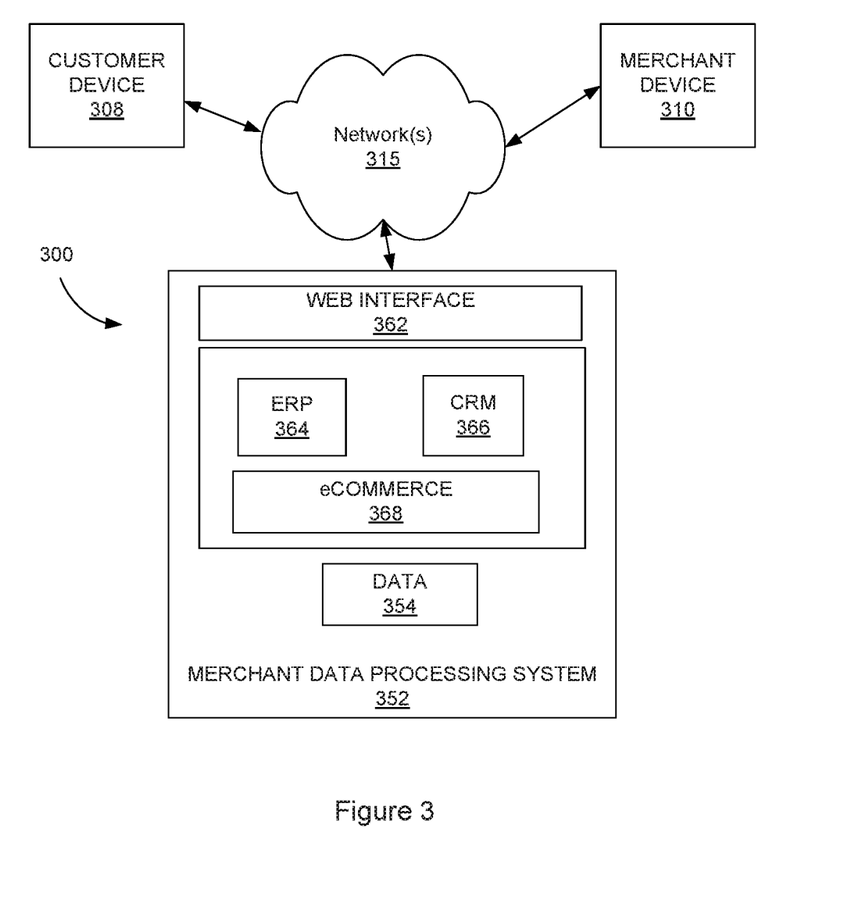
FIG. 3 is a diagram illustrating a simplified system of FIG. 1, including an integrated business system and an enterprise network in which an embodiment of the subject matter disclosed herein may be implemented.

Other objects and advantages will be apparent to one of ordinary skill in the art upon review of the detailed description and the included figures. Prior to discussing the embodiments, FIGS. 1-3 are presented to show an exemplary computing environment in which one or more embodiments may be practiced and realized.

Figure 1:
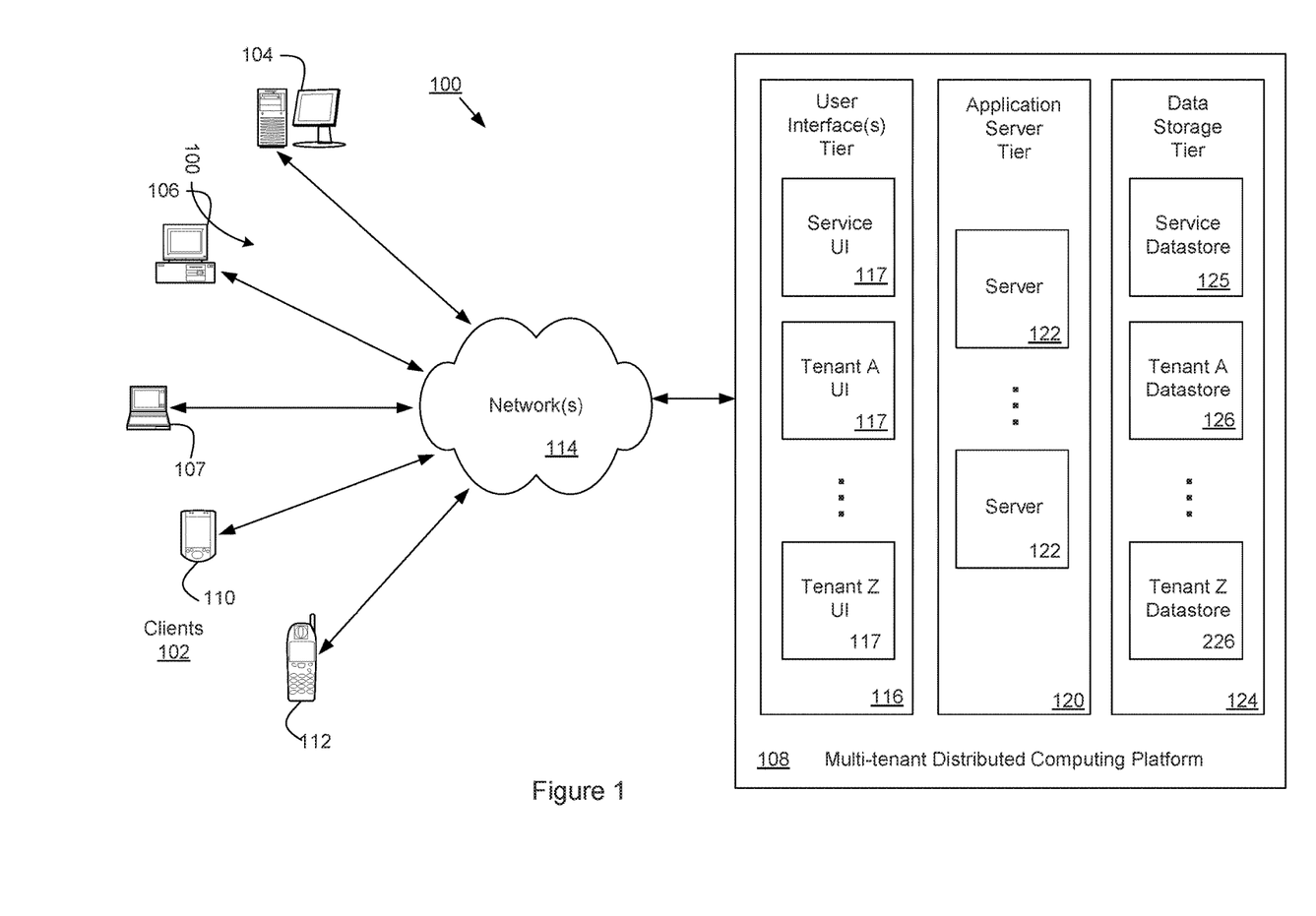
FIG. 1 is a diagram illustrating elements or components of an example operating environment in which an embodiment of the subject matter disclosed herein may be implemented.

FIG. 1 is a diagram illustrating elements or components of an example operating environment in which an embodiment may be implemented. In FIG. 1, an example operating environment 100 includes a variety of clients 102 incorporating and/or incorporated into a variety of computing devices that may communicate with a distributed computing service/platform 108 through one or more networks 114. For example, a client may incorporate and/or be incorporated into a client application (e.g., software) implemented at least in part by one or more of the computing devices. Examples of suitable computing devices include personal computers, server computers 104, desktop computers 106, laptop computers 107, notebook computers, tablet computers or personal digital assistants (PDAs) 110, smart phones 112, cell phones, and consumer electronic devices incorporating one or more computing device components, such as one or more electronic processors, microprocessors, central processing units (CPU), or controllers. Examples of suitable networks 114 include networks utilizing wired and/or wireless communication technologies and networks operating in accordance with any suitable networking and/or communication protocol (e.g., the Internet).

The distributed computing service/platform (which may also be referred to as a multi-tenant business-data-processing platform) 108 may include multiple processing tiers, including a user interface tier 116, an application server tier 120, and a data storage tier 124. The user interface tier 116 may maintain multiple user interfaces 117, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, and the like. Each processing tier shown in FIG. 1 may be implemented with a set of computers and/or computer components including computer servers and processors, and may perform various functions, methods, processes, or operations as determined by the execution of a software application or set of instructions. The data storage tier 124 may include one or more data stores, which may include a service data store 125 and one or more tenant data stores 126.

Each tenant data store 126 may contain tenant-specific data that is used as part of providing a range of tenant-specific business services or functions, including but not limited to ERP, CRM, eCommerce, Human Resources management, payroll, and the like. Data stores may be implemented with any suitable data storage technology, including structured query language (SQL) based relational data store management systems (RDBMS).

In accordance with one embodiment, the distributed computing service/platform 108 may be a multi-tenant and service platform 108 and may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an ERP system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 122 that are part of the platform's Application Server Tier 120.

Another business information system that may be provided as part of an integrated data processing and service platform is an integrated CRM system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 108 of FIG. 1) may also include one or more of an integrated partner and vendor management system, eCommerce system (e.g., a virtual storefront application or platform), product lifecycle management (PLM) system, Human Resources management system (which may include medical/dental insurance administration, payroll, and the like), or supply chain management (SCM) system. Such functions or business applications are typically implemented by one or more modules of software code/instructions that are maintained on and executed by one or more servers 122 that are part of the platform's Application Server Tier 120.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory data stores and other ERP-based systems, and can also automatically update strategic customer information data stores and other CRM-based systems. These modules and other applications and functionalities may advantageously be integrated and executed by a single code base accessing one or more integrated data stores as necessary, forming an integrated business management system or platform.

The integrated business system shown in FIG. 1 may be hosted on a distributed computing system made up of at least one, but typically multiple, "servers." A server is a physical computer dedicated to run one or more software services intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients." Depending on the computing service that a server offers it could be referred to as a data store server, file server, mail server, print server, web server, and the like. A web server is a most often a combination of hardware and the software that helps deliver content (typically by hosting a website) to client web browsers that access the web server via the Internet.

Rather than build and maintain such an integrated business system themselves, a business may utilize systems provided by a third party. Such a third party may implement an integrated business system as described above in the context of a multi-tenant platform, wherein individual instantiations of a single comprehensive integrated business system are provided to a variety of tenants. However, one challenge in such multi-tenant platforms is the ability for each tenant to tailor their instantiation of the integrated business system to their specific business needs. In one embodiment, this limitation may be addressed by abstracting the modifications away from the codebase and instead supporting such increased functionality through custom transactions as part of the application itself. Prior to discussing additional aspects of custom transactions, additional aspects of the various computing systems and platforms are discussed next with respect to FIG. 2.

FIG. 2 is a diagram illustrating additional details of the elements or components of the distributed computing service platform of FIG. 1, in which an embodiment may be implemented. The software architecture depicted in FIG. 2 represents an example of a complex software system to which an embodiment may be applied. In general, an embodiment may be applied to any set of software instructions embodied in one or more non-transitory, computer-readable media that are designed to be executed by a suitably programmed processing element (such as a CPU, microprocessor, processor, controller, computing device, and the like). In a complex system such instructions are typically arranged into "modules" with each such module performing a specific task, process, function, or operation. The entire set of modules may be controlled or coordinated in their operation by an operating system (OS) or other form of organizational platform.

In FIG. 2, various elements or components 200 of the multi-tenant distributed computing service platform of FIG. 1 are shown, in which an embodiment may be implemented. The example architecture includes a user interface layer or tier 202 having one or more user interfaces 203. Examples of such user interfaces include graphical user interfaces and application programming interfaces (APIs). Each user interface may include one or more interface elements 204. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 210 may include one or more application modules 211, each having one or more sub-modules 212. Each application module 211 or sub-module 212 may correspond to a particular function, method, process, or operation that is implemented by the module or sub-module (e.g., a function or process related to providing ERP, CRM, eCommerce or other functionality to a user of the platform). Such function, method, process, or operation may also include those used to implement one or more aspects of the inventive system and methods, such as for:
  providing a user interface for defining a search to generate a complex task that may be mapped and reduced for execution of tasks at a unit of work level to comply with governance constraints;

reducing complex tasks into more manageable smaller tasks and keeping track of results of the smaller tasks on an iterative level;

altering the reduction rules based upon real-time performance parameters of the system and usage parameters of the user and other related tenants in the multi-tenant platform.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 122 of FIG. 2) may include each application module. Alternatively, different application servers may include different sets of application modules. Such sets may be disjoint or overlapping.

The data storage layer 220 may include one or more data objects 222 each having one or more data object components 221, such as attributes and/or behaviors. For example, the data objects may correspond to tables of a relational data store, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

FIG. 3 is a diagram illustrating another perspective of a computing or data processing environment 300 in which an embodiment may be implemented. FIG. 3 illustrates a merchant's data processing system 352, where such a platform or system may be provided to and operated for the merchant by the administrator of a multi-tenant business data processing platform. Thus, the merchant may be a tenant of such a multi-tenant platform, with the elements that are part of system 352 being representative of the elements in the data processing systems available to other tenants. The merchant's data is stored in a data store 354, thereby permitting customers and employees to have access to business data and information via a suitable communication network or networks 315 (e.g., the Internet). Data store 354 may be a secure partition of a larger data store that is shared by other tenants of the overall platform.

A user of the merchant's system 352 may access data, information, and applications (i.e., business related functionality) using a suitable device or apparatus, examples of which include a customer computing device 308 and/or the Merchant's computing device 310. In one embodiment, each such device 308 and 310 may include a client application such as a browser that enables a user of the device to generate requests for information or services that are provided by system 352. System 352 may include a web interface 362 that receives requests from users and enables a user to interact with one or more types of data and applications (such as ERP 364, CRM 366, eCommerce 368, or other applications that provide services and functionality to customers or business employees).

Note that the example computing environments depicted in FIGS. 1-3 are not intended to be limiting examples. Alternatively, or in addition, computing environments in which embodiments may be implemented include any suitable system that permits users to access, process, and utilize data stored in a data storage element (e.g., a data store) that can be accessed remotely over a network. Although further examples below may reference the example computing environment depicted in FIGS. 1-3, it will be apparent to one of skill in the art that the examples may be adapted for alternate computing devices, systems, and environments.

As described herein, one or more of the functions, operations, processes, or methods used to implement an embodiment may be provided by an extension to an existing application, process, function, operation, and the like. In such an implementation, aspects of the inventive display may be provided as an extension to the operations of a multi-tenant business data processing platform or other suitable data processing system.

Figure 4A:
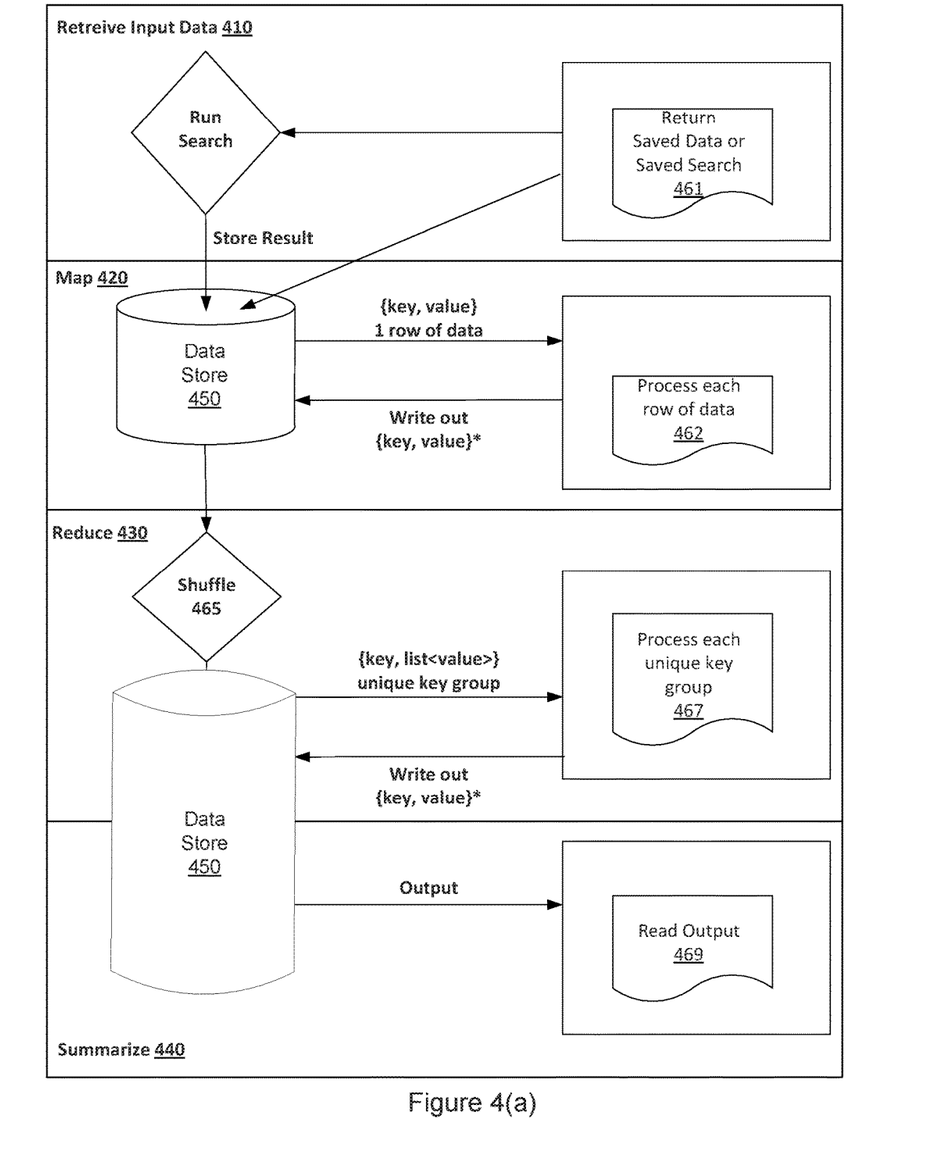
FIG. 4a is a diagram illustrating a simplified system diagram showing modules for accomplishing intelligent task management in a constrained computing environment according to an embodiment of the subject matter disclosed herein.

Turning now to specific aspects of the systems and methods as disclosed herein, FIG. 4a is a diagram illustrating a simplified system diagram showing modules for accomplishing intelligent task management in a constrained computing environment according to an embodiment of the subject matter disclosed herein. As was briefly mentioned above in an overview, the system and method may take advantage of four processing modules or stages for more efficiently handling complex tasks across a multi-tenant computing platform. These computing stages include instructions and/or resources for a module for retrieving user data 410 associated with a complex task, a module for mapping the data 420, a module for reducing the data through reduced mapped data execution 430, and a module for summarizing the resultant data 440. The various interactions of governance rules as well as criteria for task mapping and reduction are used to more efficiently execute complex tasks across a multi-tenant distributed platform.

In a conventional system, governance constraints may adversely affect larger complex jobs. Thus, when a user wishes to execute a specific complex task, the user may create such a task by conducting a search for items to be affected by a task. For example, a user may wish to complete a task of reconciling all pending sales in March such that the search criteria may be for all records of pending sales having a March date. Then, the user may run the saved search via a suitable script (e.g. to fetch all pending sales orders in March). The search returns set of results and the user may then wish to perform an action upon them (e.g., update comment). This actions costs governance units as specific resources are to be used (e.g., CPU cycles, memory, processing power, and the like). Each record that is acted upon may cost one or more governance units. Thus, the conventional system iterates tasks with respect to the result set and performs the actions until governance units are depleted. When governance units are depleted (this can be checked within the script), the script is yielded in order to reset governance. That is, the complex task is suspended until a governance constraint is cleared. When a queue reaches the yielded script, the system continues performing the actions on the results set until all tasks are completed or a governance limit is reached again. Without user intervention, the complex task may be in a perpetual state of suspense as the script remains yielded every time the governance constraints are reached or breached. When a yielded script reaches the head of the queue, the system continues performing the actions on the results set until all tasks are completed or a governance limit is reached again. Without user intervention, the complex task may be in a perpetual state of suspense as the script remains yielded every time the governance constraints are reached or breached. Thus, a system, combined with a method for reducing complex tasks to more manageable task sets will be better suited to executing with the governance constraints of said system.

FIG. 4a shows a system of computing modules for realizing a system that can engage a process to map and reduce complex tasks for suitability within governance constraints while remaining transparent to the user. The process may begin when a multi-tenant user has a complex task for executing at the multi-tenant platform. In this example, the task needed to be accomplished/executed is assumed to be complex enough to be constrained by the multi-tenant platform governance rules. The first module is the module for retrieving user data 410, which may also sometimes be referred to as the "Get Data Input" stage. In this module 410, a custom script may be executed/run that will either return a data list that is stored directly to the data store 450 in a return data step 461 or return a saved search identification 461 which executes a search for the user and stores the search result in the data store 450. In both cases the data list is stored in the data store 450. Further, each element of the data list may be a (key, value) pair. For example, if the data list represents sales orders, the key might be an identification (number) of the sales order and the value might be some, or all data of the sales order (e.g., date, size, cost, and the like).

This stage 410 is designed to retrieve a group of tasks or jobs that have execution priorities set with respect to each other e.g., a complex task. That is, execution priorities may be an underlying reason as to why data in the data list is grouped together in the first place. For example, all sales orders in a given year. These priorities as initially set may not be the most efficient way of handling the tasks within the groups retrieved. As a result, execution efficiencies can be realized if these groups of tasks/jobs are mapped and reduced in subsequent stages as described next.

The interplay between governance constraints (following rules) and governance (executing tasks) in a multi-tenant platform application is a way to control the use of common resources of the platform (CPUs, memory, disks, and the like) by a single tenant. This helps resolving the problem of resources starvation for others and attempts to share common resources evenly across multiple tenants. A governance limit system for a particular platform may be a points-based system which charges different points per API call in the user's code. There may also be a variability depending on the object type the operation targets, in some cases (e.g., simple vs complex record to load/save to/from persistence). Point-based governance may also be either characterized as having a hard terminate upon limit or a soft limit wherein the limit may be passed to allow other tasks to proceed for a time, depending on the current workload. In other embodiments, a time-based limit may be a governance constraint. The time-based limit may be wall time based, CPU time based, stack frame depth, number of program instructions, payload size (again variable per API call/object type), rate limiting and the like. One or more of these and other factors may be considered during execution and may have different enforcement behaviors.

In conventional systems, when a user script is tasked with processing a relatively large data set (e.g., 10s of 1000s of records), the developer of the script (e.g., a user) may have to manually resolve the problem of how to manage the governance constraints. That is, in order to ensure that the complex task is able to get beyond governance constraints, the developer breaks down complex tasks at the scripting level so that the complex task processes are not abruptly aborted by the multi-tenant platform system to prevent starvation (of tasks of others) and help regulate the even distribution of common resources.

For example, assume that the platform governance limit (as defined by the number of governance units or governance points that may be needed to process records with an executed script) allows the platform to process only 1000 records at a time. When a single user process goes beyond 1000 records (e.g., the governance limit is reached), the task may be terminated or suspended (in which case to prevent this, the script developer has to be cognizant about this limitation and also plan and develop the script around the constraint). If the script processes more than 1000 records (which is to say, exceeds the governance limit in this example) and the multi-tenant platform system automatically aborts the process because of a governance constraint. This may leave the user in an indeterminate state. In order to prevent this, users may workaround this governance constraint and split the script into multiple partial processes, where each partial process works on a different set of data (within governance constraints). Such work-arounds and additional scripting is inefficient and cumbersome.

In the next stage, a module for mapping data 420 may be used to determine what specific jobs/tasks exist in the retrieved data (e.g., the retrieved tasks that include at least one so-called complex task). At the map stage 420, a custom map script may be executed to work with pairs of data blocks (e.g., pairs of key, value data blocks), which may be referred to as a unit of work. A unit of work is, in essence, a less-complex task. The unit of work is supplied with one row of data in key/value pair from the retrieved results from the retrieve data stage 410. During processing 462 of key/value pairs, a user can create other objects on the platform and can return zero or more key/value pair(s) that will be used in the next stage (reduction stage 430). Each mapped unit of work may be associated with a unique key that identifies the current priority of the tasks in the context of the groups of tasks retrieved. After all the input data is processed and keyed by the mapping data 420 stage, the process may shuffle 465 the results returned by the mapping stage 420, so that the data is ordered by unique key and the data associated with each unique key will include a list of values. Continuing the sales order example from above, the custom map script function may modify the sales order given as input (e.g., update a comment) and output (e.g., customer id, item id) pair for each item on the sales order. These outputs together form the output of the map stage, which is, again, a data list of key, value pairs stored in the data store. The individual map script executions may be independent, so they can be executed in parallel to increase performance which increases efficiency over conventional methods. Further yet, if the number of the map functions (size of the input list) that need to be invoked is too large, the system may process only part of the list and reschedule the processing of the rest of the list to a later time to let other tasks on the platform to run, so that resource starvation does not occur. As briefly mentioned above, the now mapped data list produced in the map stage is input to a shuffle step 465. This step 465 may be the only stage that does not allow any custom logic. In this step 465, the data list produced in the map stage is grouped by the keys. So for each unique key, the corresponding value list is produced. In the sales order example, the keys may be customer identifications, so the shuffle step 465 would produce the list of items on all sales orders, for each customer. The list of (key, list<value>) pairs is then the input for the reduce stage.

Then, the process enters the "reduce" stage 430, and calls a custom reduce script by supplying a unique key and a list of values. Based on this data, the custom script may further process the data by creating/editing objects or return zero or more key/value pairs. Each unit of work is processed iteratively in the context of each unique key group at 467. The reduce process will help to break down the processing of the task/project script into a single unit of work (processing one record) by the script. Once the unit of work is performed 467 by the script, the method reiterates through the next unit of work in the script. This approach ensures that the user script never breaches the governance constraints and is able to complete the tasks using a single script by executing tasks on a pair-by-pair basis.

In the sales order example, the script would be given customer identifications and list of corresponding item identifications, so it can, for example, count the items for each customer and output (customer id, <item count>) pair. The (key, value) pairs outputted from custom reduce script functions are stored in the data store and are the input for the last stage—summarize stage 440. Similarly as for the map stage 420, the individual reduce script executions are designed to be independent, so as to be executed in parallel to increase efficiency and performance. Further, if the number of the custom reduce functions (size of the input list) that need to be invoked is too large, the system may process only part of the data list and reschedule the processing of the rest of the data list to a later time to let other tasks on the platform to run, so that resource starvation does not occur. The reduce stage 430 may have a number of different factors that influence the process of dividing a complex tasks into smaller manageable tasks. In one embodiment, the division rules may be based upon user parameters such as a specific subscription plan that the user may have with a general software as a service (SaaS) offering. For example, if a user pays for a more robust subscription to the SaaS, then the user may be afforded greater governance constraints and consequently a greater flexibility in division rules. Further, the user with a more robust subscription to the SaaS may have access to parallel processing that may affect division rules during a reduce stage of this process.

In another embodiment, the division rules may be based upon system performance parameters. For example, if recent historical use statistics indicate that additional processing power may be available, then the division rules may be modified to allow for larger task grouping when reducing the complex task. In general, if additional processing power or additional memory is available, the system may allocate such excess resources by adjusting the division rules when mapping and reducing a complex task.

In yet another embodiment, the division rules may be based upon real-time values associated with the user or associated with other tenants in the multi-tenant platform. Such real-time values may include current total number of current users invoking processing in the system, total parallel processes currently being invoked, and other real-time usage and performance parameters.

When iterative accomplishment of all tasks in the retrieved group of tasks is finished at the reduce stage 430, the process enters a "summarize" stage 440. At this stage 440, a custom summarize script can access at the output of reduce stage 430, and decide to store that output either as a custom record, or a file or email and send the output to somewhere outside of the multi-tenant platform. Further, the summarize stage 440 also affords an opportunity to inspect the final (key, value) list together with other data collected during the run of the task, such as errors, number of reschedule operations, number of processed (key, value) pairs, and the like.

With such systems and methods and discussed with respect to FIG. 4a, functionality is provided to interrupt a long running process in the middle of execution. In the past, such interruption would result in having no way to know what a custom script was doing in the middle of its execution. Consequently, the entire complex task would need to start over. However with use of the map/reduce script, complex custom code can be delineated through different stages. Furthermore, in the map and reduce stages, one can break custom code down so as to be run per data row. In this embodiment, after each row (key, value pair) is processed, control reverts back to the administrator/controller/control process such that the results of each data row being processed, a storage of the results takes place to ensure that already processed tasks are not lost if an interruption occurs. Another embodiment that builds on this idea is that because the control goes back to the administrator/controller between each row processing during the map and reduce stages 420 and 430, before a task or process is terminated, one can invoke a custom function to perform "cleanup" or "housekeeping" tasks. This may be done by using custom code to implement another interface. This may be very beneficial to developers by permitting at least partial execution of their code before termination. In further embodiments, a notification of abnormal termination may be used to indicate when the system automatically handles maintaining the state of processing. When abnormal termination is invoked, records may be "replayed" to the tenant with the additional termination context in order to allow for custom cleanup logic,—for example compensating logic on another third party system.

In another embodiment, one can provide different options for a cancel operation. For example, one kind of cancel may be to stop any further process and just terminate, and another kind of cancel may mean to stop the map and reduce stages 420 and 430 and proceed directly to the summarize stage for tasks already completed. This second kind of cancel is useful in that one reason a user may wish to cancel a script is to free up the queue so another task can be processed right away. Thus, it improves overall efficiency to save results of tasks that have already been accomplished.

In all of the afore-mentioned embodiments, the process (es) described and illustrated provide a way to manage the interruptions to the script execution at the level of the individual unit of work. For example, a script that would be set up to process/run through 25 records may be interrupted by a user/system after the script has processed the top 5 records, without causing the system to be left in an indeterminate state. The user may then have to resubmit the script job to process the remaining 20 records. The system may insert an artificial interrupt after a certain number of units of work (e.g., based on or related to a governance limit) have been processed to ensure no resource starving for other users or tenants. This may be followed by resubmitting the same job to ensure that all of the records are processed and the intended job is completed. These aspects of the system of FIG. 4a are shown in the context of the method of the flow chart of FIG. 4b next.

Figure 4B:
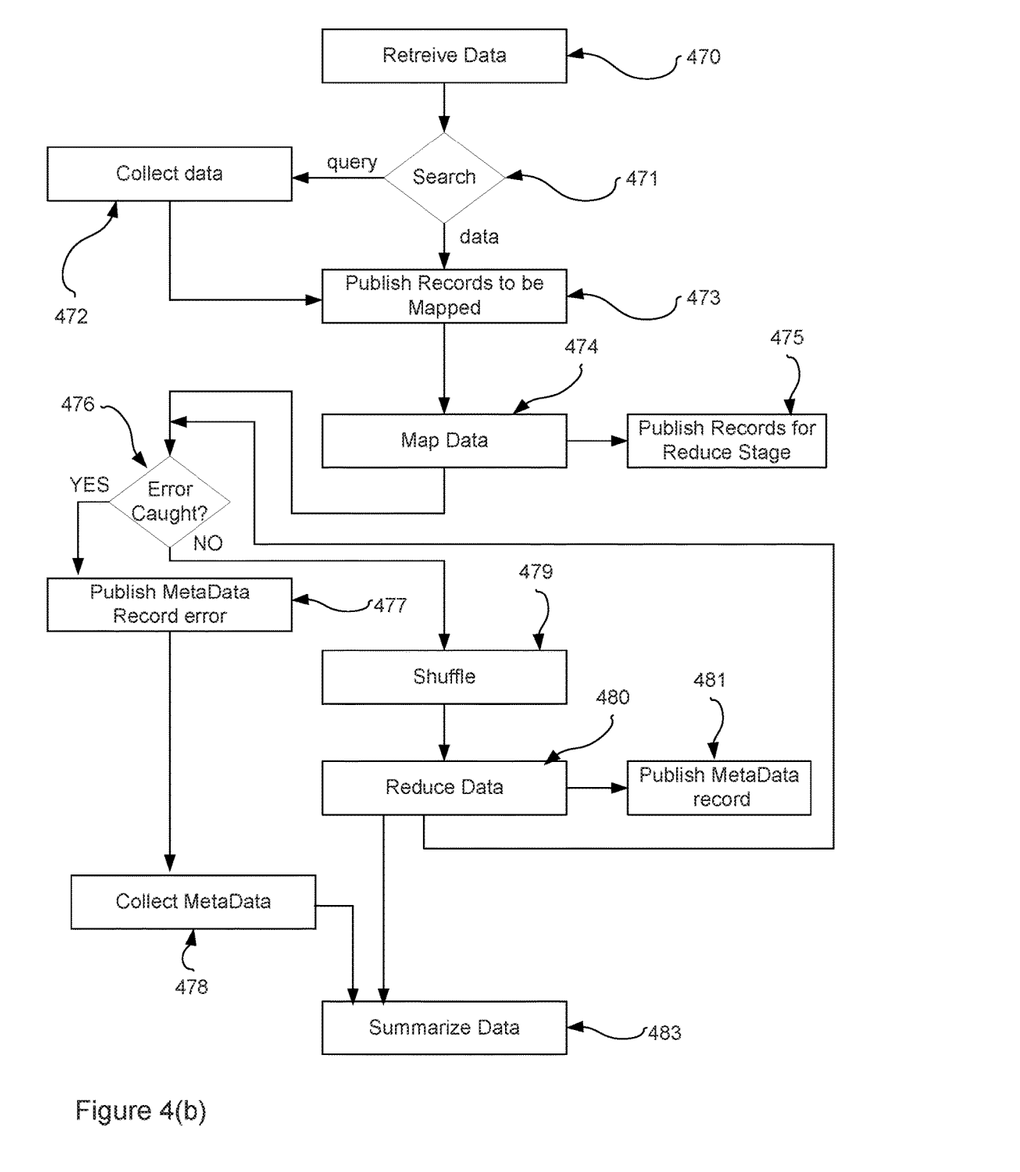
FIG. 4b is a diagram illustrating a flow chart of a method for accomplishing intelligent task management in a constrained computing environment according to an embodiment of the subject matter disclosed herein.

FIG. 4b is a diagram illustrating a flow chart of a method for accomplishing intelligent task management in a constrained computing environment according to an embodiment of the subject matter disclosed herein. The method may be triggered by the system based on a predefined schedule, or may be started on demand via a user interface, or a script application programming interface (API) call specifying the script configuration to be executed. Once the triggered job reaches the head of the queue, the system may execute a custom retrieve data function at step 470 provided or defined by a user. The method then moves to a decision step 471 wherein the retrieve data function may be an existing saved search (query), an ad-hoc search definition (query object), or raw data itself in the form of a JavaScript data structure. If the returned value is a query, the system will execute the query at a collect data step 472 in order to derive the raw data list to be processed. The raw data list, whether from a collect data step 472 or from a direct data structure from the search is then passed to a publish records to be mapped step 473 where all tasks assembled and ready for task execution at the map stage.

The raw data list is then assessed in terms of the key, value pairs for each record in the raw data list. That is, the individual elements (keys and values) are mapped as individual pairs in a map at step 474. The new map of the list data may be published to a data store in the publish records for reduce stage step 475.

At step 479, the mapped data list may then be rearranged at a shuffle step where the individual pairs are reordered according to the unique keys associated with each key, value pair. At step 480, the method begins to process each pair within the mapped task data. The system then may process the individual data published by the previous stage in a parallel manner, managing locking, parallelism and multi-tenant fairness in an automatic fashion, yielding control to other processes dynamically after a certain amount of work has been done. There may be a rating system which assigns a point value to represent usage of system resources, such as CPU time, data store connections and HTTP callouts. This rule system (or another suitable form of one) is used to decide when the script yields control of a processor/machine/thread. Such machinations of the reduce data list step 480 may be published as meta data at step 481. Lastly, the processed data list may be summarized at step 483.

An additional aspect of the method of FIG. 4b may include error checking steps. The error checking steps include checking for any error at step 476. If an error is caught, the error may be published in a metadata record at step 477 and also summarized at step 478 (in one embodiment, parallel with the summarize step 483). The error checking may occur after the initial mapping step 475 and after each reduce data list iteration at step 480.

Figure 5:
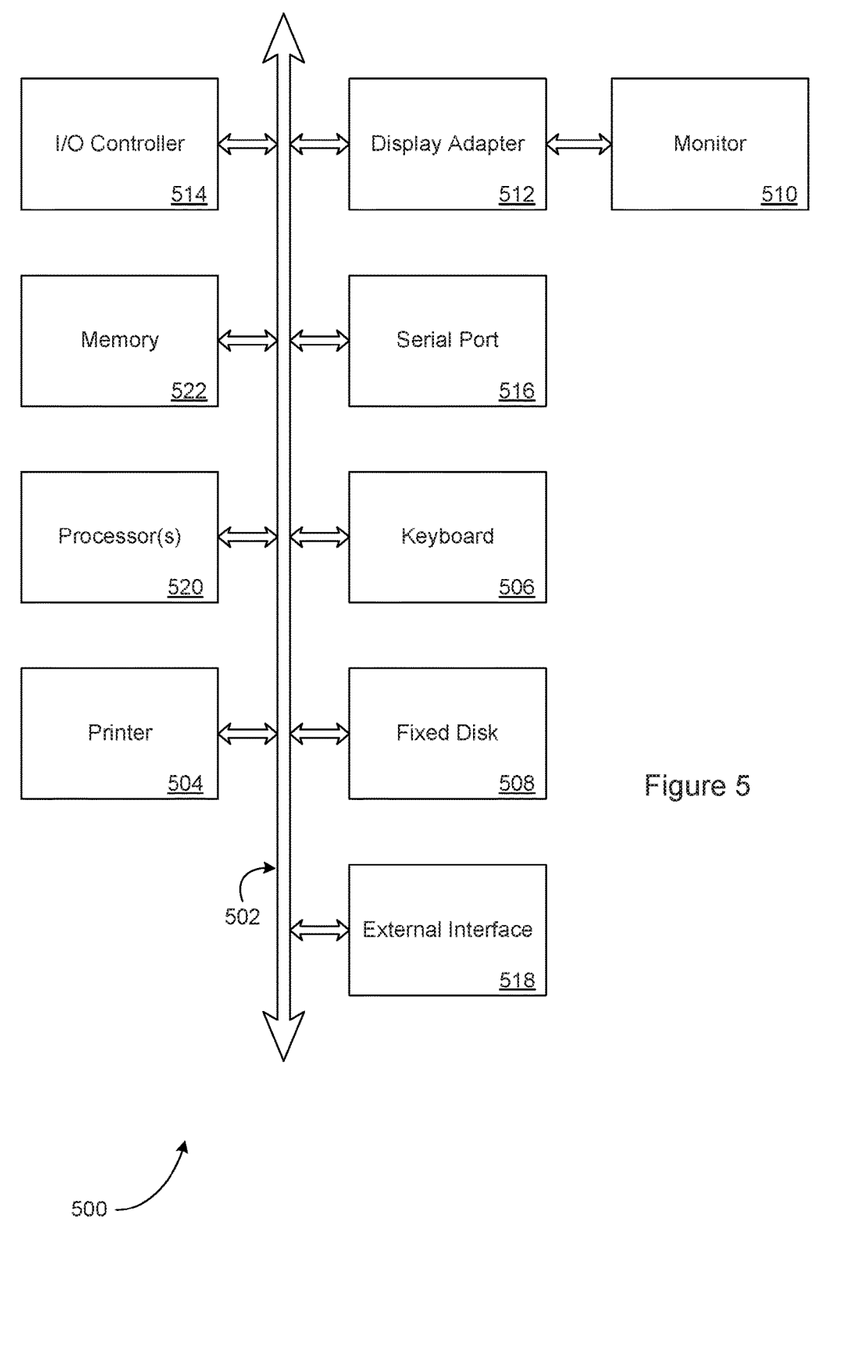
FIG. 5 is a diagram illustrating elements or components that may be present in a computer device or system configured to implement a method, process, function, or operation in accordance with an embodiment.

In accordance with one embodiment, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 5 is a diagram illustrating elements or components that may be present in a computer device or system 500 configured to implement a method, process, function, or operation in accordance with an embodiment. The subsystems shown in FIG. 5 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 600 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present disclosures as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

That which is claimed is:

1. A computer-based method for more efficiently accomplishing a complex task, the method comprising:
   collecting data about a complex task, the complex task, if executed, exceeding at least one governance constraint for a multi-tenant computer processing platform;
   dividing the complex task into a series of less-complex tasks generated from the complex task, wherein the complex task is associated with a data list comprising a plurality of elements, wherein each of the plurality of elements comprises one or more sub-elements represented by a respective key/value pair, and wherein dividing the complex task into a series of less-complex tasks comprises:
      assigning a key/value pair to each sub-element of each of the plurality of elements; and
      grouping the sub-elements of the plurality of elements into the data list according to a value of a key of the key/value pair associated with each sub-element to yield the series of less-complex tasks;
   generating a mapping of the less-complex tasks; and
   executing the less-complex tasks in accordance with the mapping and within governance constraints.

2. The method of claim 1, further comprising executing the less complex tasks in a parallel processing manner.

3. The method of claim 1, further comprising synchronizing results of the executing of the less-complex tasks to yield an overall result of the complex task.

4. The method of claim 1, further comprising reducing the complex task to a series of reduced tasks by identifying a unit of work and generating reduced tasks based on the identified unit of work.

5. The method of claim 4, further comprising altering the generating of the less-complex tasks in response to a real-time value corresponding to a user multi-tenant computer processing platform.

6. The method of claim 4, further comprising altering the generating of the less-complex tasks in response to a real-time value corresponding to a tenant of the multi-tenant computer processing platform.

7. The method of claim 1, further comprising altering the generating of the less-complex tasks in response to a real-time value corresponding to a performance parameter of the multi-tenant computer processing platform.

8. The method of claim 1, further comprising generating the mapping of the less-complex tasks based on a user-defined importance factor for each reduced task.

9. A multi-tenant distributed computer processing system, comprising:
   at least one processor for processing instructions from a plurality of tenants on a multi-tenant computing platform;
   a collection module for collecting sets of instructions to be executed, at least one set collected having a complex task that would exceed an execution governance constraint of the multi-tenant computing platform if executed;
   a mapping module configured to prioritize the sets of instructions in the complex task by dividing the complex task into a series of less-complex tasks generated from the complex task, wherein the complex task is associated with a data list comprising a plurality of elements, wherein each of the plurality of elements comprises one or more sub-elements represented by a respective key/value pair, and wherein the mapping modules is configured to divide the complex task into the series of less-complex tasks by:
      assigning a key/value pair to each sub-element of each of the plurality of elements; and
      grouping the sub-elements of the plurality of elements into the data list according to a value of a key of the key/value pair associated with each sub-element to yield the series of less-complex tasks; and
   a reduction module configured to send sets of instructions to the processor for execution based on a mapping of the sets of instructions, the sending of the sets of instructions in accordance with the mapping and within the execution governance constraint.

10. The system of claim 9, further comprising a summarization module configured to assemble results of the executed instructions that are part of the complex task.

11. The system of claim 9, wherein the mapping module is further configured to prioritize the sets of instructions in the complex task based upon a time in which an instruction was created.

12. The system of claim 9, wherein the mapping module is further configured to prioritize the sets of instructions in the complex task based upon a dependency upon one or more other instructions.

13. The system of claim 9, wherein the mapping module is further configured to prioritize the sets of instructions in the complex task based upon a user-defined importance.

14. The system of claim 9, wherein the reduction module is configured to process sets of instructions from a group of similarly prioritized instructions sets.

15. The system of claim 9, wherein the at least one processor comprises a group of cooperatively configured processors configured to process instructions in a parallel manner.

16. The system of claim 9, further comprising a memory disposed in a computing entity remote from a processing entity, the memory configured to store results of the execution of the set of instructions in the complex task.

17. The system of claim 9, wherein the reduction module is further configured to iteratively send a new set of instructions to be executed by the at least one processor after a set number of instruction executions.

* * * * *